RAMP FUNCTION TRANSISTOR CIRCUIT
Filed June 27, 1957
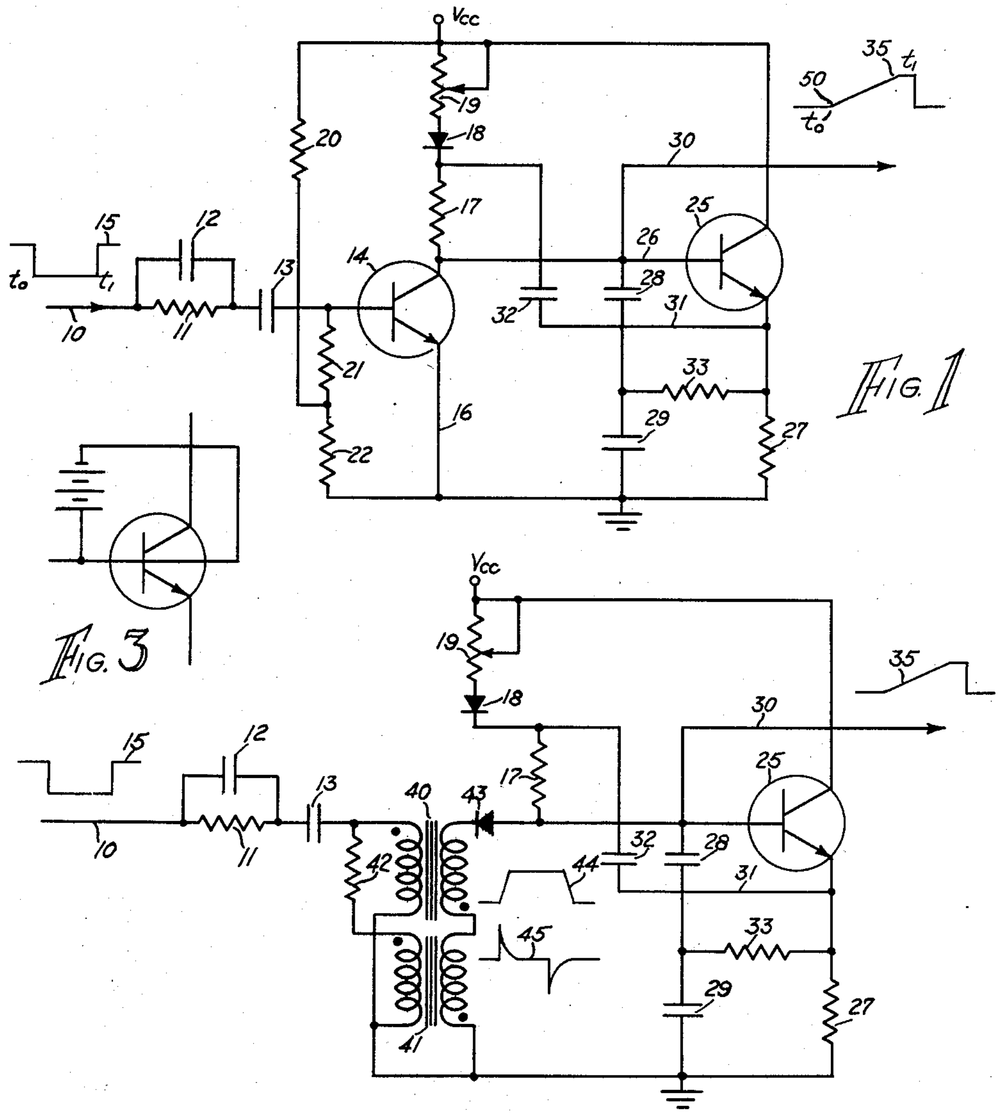
FIG. 1, FIG. 3
FIG. 2
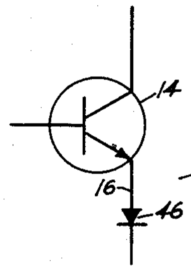
FIG. 4
INVENTOR.
EUGENE S. McVEY
BY [signature]
ATTORNEYS United States Patent Office 2,892,952
Patented June 30, 1959

2,892,952

RAMP FUNCTION TRANSISTOR CIRCUIT

Eugene S. McVey, Fort Wayne, Ind., assignor to the United States of America as represented by the Secretary of the Navy Application June 27, 1957, Serial No. 668,573

6 Claims. (Cl. 307—88.5)

(Granted under Title 35, U.S. Code (1952), sec. 266)

The invention described herein may be manufactured and used by or for the Government of the United States of America for governmental purposes without the payment of any royalties thereon or therefor.

This invention relates to ramp fuction generator circuits and more particularly to semi-conductor or transistor "bootstrap" circuits used to provide a ramp voltage function in correspondence with each predetermined gating pulse.

"Bootstrap" circuits produced by the use of vacuum tubes are well-known in the art to produce linear ramp voltage functions or waveforms for particular applications. While such vacuum tube circuits have been successfully used in numerous applications, the coming of semi-conductors has opened new fields of electronic science to provide electronic components of lighter weight and of less bulk.

In the present invention semi-conductors, one form being commonly recognized as transistors, are used to provide a "bootstrap" circuit to produce a linear ramp voltage function. The circuit of this invention may find application in many ways, one particular application being in a component of a radar range unit wherein a range voltage may be compared with a reference voltage in a multiar component for use in converting this range voltage amplitude with respect to time for the solution of the range problem. A negative gating pulse in the order of, for example, thirty microseconds may be applied to the circuit of this invention to compare with a reference voltage either in a semi-conductor means or a transformer component to initiate a ramp voltage function in the output of the circuit operative for the range problem. This is accomplished by the production of a constant current through an element, as a resistance, to be accumulatively stored in a capacitor means for building up a voltage in a linear manner. It is, therefore, a general object of this invention to provide a "bootstrap" semi-conductor circuit for producing linear ramp voltages in direct correspondence to the time interval of gating pulses applied thereto.

These and other objects, advantages, features and uses may become more apparent as the description proceeds when taken in consideration with the accompanying drawing, in which:

Figure 1 is a schematic circuit diagram of the preferred form of the invention utilizing two transistors;

Figure 2 illustrates a schematic circuit diagram of the circuit of Figure 1 modified to the extent that only one transistor is used;

Figure 3 illustrates a tetrode transistor which may be used to an advantage in Figures 1 and 2; and Figure 4 illustrates a modification of the circuit in Figure 1 using a diode in combination with the comparing transistor to improve frequency response.

Referring more particularly to Figure 1, an input circuit, identified by the reference character 10, is coupled through a resistor 11 and a capacitor 12 in parallel, which parallel circuit is in series with a capacitor 13 to the base electrode of a semi-conductor herein shown and described as a transistor 14. The input circuit is adapted to receive negative gating pulses, one of which is illustrated at 15 above the conductor 10. The resistor 11 is used to keep from loading the gating generator (not shown) while the transistor 14 is conducting, and the capacitor 12 differentiates the input voltage pulses and improves their rise time.

The transistor 14 is emitter grounded by the conductor 16 and its collector is coupled through a fixed resistor 17, a diode 18, and a variable resistance 19 in series to a reference voltage source $V_{cc}$. The base of transistor 14 is biased by resistors 20, 21, and 22, the resistors 20 and 22 being in series between the voltage source $V_{cc}$ and ground and the junction of the resistors 20 and 22 being coupled through the resistor 21 to the transistor base.

A transistor-amplifier 25 has its base coupled by a conductor 26 to the collector of transistor 14. The collector of transistor 25 is coupled directly to the reference voltage source $V_{cc}$ and the emitter of this transistor is coupled through a resistor 27 to ground. While the transistors 14 and 25 are illustrated herein as being of the N–P–N type, it is to be understood that P–N–P types may be used by changing polarities, where desirable. The collector of transistor 14 and the base of transistor 25 are coupled to a storage circuit consisting of the capacitors 28 and 29 in serial relation between the conductor 26 and ground. The output circuit 30 is coupled to the conductor 26. The transistor-amplifier 25 has a feedback circuit from its emitter via the conductor 31 through a capacitor 32 to the junction of resistor 17 and the diode 18. For the reasons more particularly described hereinafter, a resistance 33 is coupled across the emitter of transistor 25 and the junction of the capacitors 28 and 29 in the storage circuit to compensate for the effect on voltage in the output circuit 30 which would result from a change in voltage drop across the fixed resistance 17. In the operation of this circuit, as will be hereinafter described, a ramp voltage function will appear on the output 30 as shown by the waveform 35 above this conductor.

Referring more particularly to Figure 2 wherein like reference characters in Figure 1 designate like parts, the input circuit 10 to 13, inclusive, is coupled to two transformers 40 and 41, the primary of transformer 40 being coupled from the input circuit directly to ground and the primary of the transformer 41 being coupled from ground through a resistor 42 to the input circuit. The secondaries of the transformers 40 and 41 are coupled in series with a diode 43 between the fixed resistor 17 and ground, the diode 43 being in series between resistor 17 and the first secondary and being oriented with the low forward resistance from the resistor 17 to ground. The remainder of the circuitry is identical to that shown and described with reference to Figure 1 with the exception that the base biasing network 20—22 is not needed. The transformer 40 is constructed and arranged and poled as shown by the dots to pass each gating pulse 15 which will appear as a positive pulse 44 in the secondary thereof while the transformer 41 is constructed and arranged and poled to produce a fast rise time, in combination with the diode 43 in the secondary circuit, to produce a waveform 45 of sharp leading and trailing edges of the gating pulse. Since the transformer 40 is incapable of producing a fast rise time resulting in the waveform shown by 44, the transformer secondaries being in series produce a resultant positive waveform having sharp leading and trailing edges by reason of the voltage wave 45 produced by the secondary of transformer 41. This voltage wave, when applied to the fixed resistor 17, is operative to produce a ramp function, as will hereinafter be described. The remainder of the circuit is the same as in Figure 1 except for the elimination of the biasing network 20—22.

Figure 3 illustrates a tetrode transistor which may be used in substitution for each of the transistors 14 and 25, where desirable. Such a tetrode transistor may be utilized where a voltage gain at higher frequencies is required. Such tetrode transistors may also show favorable frequency response which may be essential to the circuit.

Figure 4 illustrates a modification in the circuit coupling of the transistor 14 in Figure 1 wherein a diode 46 is connected in the conductor 16 in series between the emitter and ground with the low forward resistance thereof oriented from emitter to ground. The diode 46 may be included to improve the frequency response of the transistor 14 and thus sharpen the cutoff and conduction characteristics of this transistor in accordance with the leading and trailing edges of each gating pulse.

In the operation of the circuit shown in Figure 1, let it be assumed that a gating pulse circuit (not shown) is coupled to the input circuit 10 to provide negative gating pulses 15, for example, each in the order of thirty microseconds of duration. Transistor 14 is so biased by the network 20—22 that it normally conducts heavily in the absence of a negative pulse. By making the base current greater than the collector current divided by $$\text{Beta, } B \text{ or } I_b > \frac{I_c}{B}$$

the transistor 14 is made to operate in the saturation region. For the circuit of Figure 1 it was found advisable to make $$I_b = 7.5\frac{I_c}{B}$$

so that saturation is assured without placing too severe requirements on the input signal and the transistor. Beta is equal to $$\frac{a}{1-a}$$

where $a$, or Alpha, is equal to the small signal current amplification factor for grounded base connection. Each pulse 15 will be applied through the circuit 11 to 13 to the base of the transistor 14. This negative gating pulse drives the base of transistor 14 negative with respect to the emitter thereof producing a sharp cutoff of conduction through this transistor except for leakage current recognized as being existent in the art and identified as $I_{co}$. Upon the conduction of transistor 14 being cut off, the voltage at the collector thereof begins to rise by reason of the current flow through the fixed resistance 17. The current flow through the fixed resistor 17 is maintained constant by reason of the feedback by way of 31 and 32 from the transistor 25. The voltage rise at the collector of transistor 14 is applied directly by the conductor 26 to the base of the transistor 25 which causes the emitter of transistor 25 to rise and feed back a current to keep the voltage across resistor 17 constant. Since the voltage across the resistor 17 is maintained constant, the current through this fixed resistor 17 will be maintained constant which current is applied to the storage circuits 28 and 29 gradually building up a charge in this storage circuit to produce the linear ramp function shown on the output 30 by the waveform 35. In practice, it has been found that approximately 0.1 to 0.5 of a microsecond is lost during the period of time that the transistor 14 is changing from full conduction to complete cutoff which produces a very slight curve in the starting portion 50 of the linear ramp voltage 35. Such a time lapse in the ramp function voltage may be minimized by utilizing transistors as shown in Figure 3 or by the use of a diode 46 as shown in Figure 4. As the amplifier feeds back current through the circuit 31—32 to the junction of the fixed resistor 17 and the diode 18, the cathode of this diode 18 is driven positive with respect to the reference voltage $V_{cc}$ at which time the diode 18 disconnects the circuit and becomes nonconductive. In this manner the ramp voltage can be developed to be coextensive in time exactly with the gating pulse. For example, let the starting time of the gating pulse be represented by $t_0$ and the trailing edge as $t_1$. The output ramp voltage will start at $t_0$ or at the beginning of the curve 50 and end at $t_1$ or at the point that the linear ramp function ends. The short period following $t_1$ is the operation of the circuit at the peak voltage adjusted by the control 19 at the time of disconnection by the diode 18 after which the transistor 14 again becomes fully conductive.

The circuit of Figure 2 will operate substantially the same as that described for Figure 1. In the absence of a negative pulse, conduction through the transformer secondaries from $V_{cc}$ to ground will be heavy. Each positive resultant pulse, produced by the secondaries of the transformers 40 and 41, will block conduction from the reference voltage source $V_{cc}$ to ground to allow constant current flow through the fixed resistor 17 to charge the storage circuits 28 and 29, as hereinbefore described. The transistor amplifier 25, feeding back current through the circuits 31 and 32, will maintain the voltage constant across the fixed resistor 17 as before to produce the ramp voltage 35 on the output 30 as hereinbefore described. Any change in voltage drop whatsoever across the resistor 17 in either of the circuits of Figure 1 or Figure 2, which is necessary to make the amplifier 25 operate, would normally cause a slight change in the slope of the voltage ramp in the output circuit 30. Such a change in the ramp voltage function is avoided by the feedback through the resistor 33 from the emitter of transistor 25 to the storage circuits 28 and 29 thus providing a smooth linear ramp voltage 35 on the output 30.

The gating pulse 15 provides gating in the transistor 14 and in the transformers 40 and 41 to produce a voltage drop across the resistor 17. The amplifier transistor 25 and its feedback circuit in combination with the storage circuit 28 and 29 provide the "bootstrap" portion of the circuit whereby the ramp voltage 35 is produced.

While it is understood that there may be slight variations in the reference voltage $V_{cc}$, in the compensating resistor 33 or the fixed resistance 17, in the storage circuits 28 and 29, in the collector and emitter voltages of the transistors or in the forward drop of the disconnect diode 18, or in the frequency response characteristics or the $I_{co}$ leakage currents in the transistors or other components used, it is to be understood that the accuracy of the circuit can be maintained to the extent of the quality of the circuit elements and components used. It is also to be understood that where these variations may be intolerable other or more compensating circuitry may be added without departing from the spirit and scope of this invention. For example, the fixed resistor 17 should be chosen with a positive temperature coefficient to compensate for the negative temperature coefficient of the transistor 14 and the disconnect diode 18. Where the circuitry is to be used under conditions of an extreme temperature range it may be necessary to add temperature compensating circuitry to maintain the desired accurate ramp function.

While many modifications and changes may be made in the constructural details of the circuits shown and described by the elimination or addition of temperature or other compensating circuitry, it is to be understood that I desire to be limited only by the scope of the appended claims.

I claim:

1. A bootstrap circuit comprising: an input circuit for receiving gating pulses of predetermined time intervals;

means coupled to said input circuit for developing and storing a constant current producing a ramp voltage in correspondence with each gating pulse, said means including a means of developing a voltage across a fixed resistor, an amplifier transistor having emitter and base coupled across said fixed resistor for amplifying any change in voltage across said fixed resistor and feeding current back to said fixed resistor in opposition to said voltage changes to produce said constant current for storage, two capacitors coupled in series between the base of said amplifier transistor and ground, and a compensating resistor connected between said amplifier transistor and a common coupling between said capacitors; and an output circuit coupled to the base of said amplifier transistor for applying said ramp voltage.

2. A bootstrap circuit comprising: an input circuit for receiving gating pulses of predetermined time intervals; means coupled to said input circuit for developing and storing a constant current, said means being a pair of series coupled transformers in series with a fixed resistor and a diode in that order to a fixed potential, with the emitter and base of an amplifier transistor coupled across said fixed resistor to produce a constant current through said fixed resistor during said gating pulses, and with storage capacitors coupled to said transistor base and to an output circuit whereby ramp voltages are developed for the output circuit for each gating pulse.

3. A bootstrap circuit as set forth in claim 2 wherein said series coupled transformers include one transformer constructed and arranged to pass the low frequencies of the gating pulses and one transformer constructed and arranged to pass the high frequencies of the gating pulses to cause the ramp function to start precisely at the time of occurrence of each gating pulse leading edge.

4. A bootstrap transistor circuit comprising: an input circuit coupled to the base of a first transistor for receiving gating pulses of predetermined time intervals, said first transistor having its emitter and collector in a serial coupling with a fixed resistor, a first diode, and a variable resistor, in that order, across a direct current voltage; an amplifier transistor having its emitter and collector coupled across said direct current voltage and its base coupled to the coupling between said first transistor and said fixed resistor; a voltage divider comprising a pair of resistances serially coupled across said direct current voltage and a resistance coupled between the base of the first transistor and a common junction between each resistance of said pair for providing a bias; a feedback from said amplifier transistor to the coupling between said fixed resistor and said diode; capacitor means coupled between the base of said amplifier transistor and ground; and an output circuit coupled to the base of said amplifier transistor whereby conduction of said first transistor is controlled during a gating pulse to produce a constant current through said fixed resistor thereby charging said capacitor means to provide a ramp voltage on said output.

5. A bootstrap transistor circuit as set forth in claim 4 wherein said feedback includes a capacitor and said capacitor means comprises two capacitors in series with a compensating resistor connecting the common coupling thereof to said amplifier transistor.

6. A bootstrap transistor circuit as set forth in claim 5 wherein said serial coupling includes a second diode to improve frequency response.

References Cited in the file of this patent

UNITED STATES PATENTS 2,597,322 Higinbotham ___________ May 20, 1952